US012681512B2

(12) United States Patent
Pariseau et al.

(10) Patent No.: US 12,681,512 B2
(45) Date of Patent: Jul. 14, 2026

(54) THERMOSTAT WITH INTEGRATED PARTICLE SENSOR

(71) Applicant: Particles Plus, Inc., Stoughton, MA (US)

(72) Inventors: David Pariseau, Los Altos, CA (US); Adam Giandomenico, Canton, MA (US)

(73) Assignee: Particles Plus, Inc., Stoughton, MA (US)

( * ) Notice: Subject to any disclaimer, the term of this patent is extended or adjusted under 35 U.S.C. 154(b) by 0 days.

(21) Appl. No.: 14/427,630

(22) PCT Filed: Sep. 12, 2013

(86) PCT No.: PCT/US2013/059549
§ 371 (c)(1),
(2) Date: Mar. 11, 2015

(87) PCT Pub. No.: WO2014/043413
PCT Pub. Date: Mar. 20, 2014

(65) Prior Publication Data
US 2015/0323941 A1     Nov. 12, 2015

Related U.S. Application Data

(60) Provisional application No. 61/700,208, filed on Sep. 12, 2012.

(51) Int. Cl.
*G05D 23/19*     (2006.01)
*F24F 11/30*     (2018.01)
(Continued)

(52) U.S. Cl.
CPC .............. *G05D 23/19* (2013.01); *F24F 11/30* (2018.01); *F24F 11/523* (2018.01); *F24F 11/58* (2018.01);
(Continued)

(58) Field of Classification Search
CPC ..... G05D 23/19; G05D 23/1902; F24F 11/30; F24F 2110/66; F24F 2110/76; F24F 2110/20; F24F 2110/10
See application file for complete search history.

(56) References Cited

U.S. PATENT DOCUMENTS

| | | | | |
|---|---|---|---|---|
| 5,001,463 A | * | 3/1991 | Hamburger | .......... G01N 1/2205 |
| | | | | 340/627 |
| 5,426,501 A | * | 6/1995 | Hokanson | .......... G01N 15/1456 |
| | | | | 250/222.2 |

(Continued)

FOREIGN PATENT DOCUMENTS

| | | |
|---|---|---|
| CN | 1570604 A | 1/2005 |
| CN | 101253460 A | 8/2008 |

(Continued)

OTHER PUBLICATIONS

Kamijo et al., Display Method Measuring Value of Duct Quantity, Oct. 10, 2001, JP2001281129A, Whole Document (Year: 2001).*

(Continued)

*Primary Examiner* — Larry L Furdge
(74) *Attorney, Agent, or Firm* — McCarter & English, LLP

(57) ABSTRACT

A residential or commercial thermostat incorporating an airborne particle sensor. A standard thermostat device incorporating at least one temperature sensor and at least activation of heating and/or cooling with the addition of an on-board particle sensor. The particulate information could simply be displayed, or could be part of controlling filtration or air-handling equipment.

10 Claims, 5 Drawing Sheets

Particle sensor inlet 203

Particle sensor exhaust 204

200

Graphic display + Touch screen 202

Injection molded plastic enclosure 201

(51) Int. Cl.

| | | |
|---|---|---|
| *F24F 11/523* | (2018.01) |
| *F24F 11/58* | (2018.01) |
| *F24F 11/63* | (2018.01) |
| *F24F 11/76* | (2018.01) |
| *F24F 110/10* | (2018.01) |
| *F24F 110/20* | (2018.01) |
| *F24F 110/66* | (2018.01) |
| *F24F 110/76* | (2018.01) |

(52) U.S. Cl.
CPC .............. *F24F 11/63* (2018.01); *F24F 11/76* (2018.01); *G05D 23/1902* (2013.01); *F24F 2110/10* (2018.01); *F24F 2110/20* (2018.01); *F24F 2110/66* (2018.01); *F24F 2110/76* (2018.01)

(56) References Cited

U.S. PATENT DOCUMENTS

| | | | | |
|---|---|---|---|---|
| 5,428,964 | A * | 7/1995 | Lobdell | G05D 27/02 |
| | | | | 62/176.6 |
| 5,870,190 | A * | 2/1999 | Unger | G01N 15/0205 |
| | | | | 356/336 |
| 6,035,551 | A * | 3/2000 | Scheufler | B01D 46/00 |
| | | | | 34/475 |
| 6,398,118 | B1 * | 6/2002 | Rosen | F24F 11/30 |
| | | | | 236/49.3 |
| 6,988,671 | B2 | 1/2006 | DeLuca | |
| 7,058,477 | B1 | 6/2006 | Rosen | |
| 7,150,408 | B2 | 12/2006 | DeLuca | |
| 7,302,313 | B2 | 11/2007 | Sharp et al. | |
| 7,343,751 | B2 | 3/2008 | Kates | |
| 7,616,126 | B2 | 11/2009 | Kadwell et al. | |
| 7,867,779 | B2 | 1/2011 | McDermott et al. | |
| 8,047,055 | B2 | 11/2011 | Wang et al. | |
| 8,146,376 | B1 | 4/2012 | Williams et al. | |
| 8,219,249 | B2 * | 7/2012 | Harrod | F24F 11/0086 |
| | | | | 62/150 |
| 9,170,180 | B2 | 10/2015 | Shinohara et al. | |
| 9,261,287 | B2 | 2/2016 | Warren et al. | |
| 9,335,244 | B2 | 5/2016 | Han | |
| 2003/0051023 | A1 * | 3/2003 | Reichel | G01N 33/0075 |
| | | | | 709/223 |
| 2004/0222307 | A1 * | 11/2004 | DeLuca | F24F 11/30 |
| | | | | 236/46 R |
| 2005/0005677 | A1 * | 1/2005 | Smith | G01N 15/0205 |
| | | | | 73/28.02 |
| 2005/0144963 | A1 | 7/2005 | Peterson et al. | |
| 2005/0161517 | A1 * | 7/2005 | Helt | G05D 23/1905 |
| | | | | 236/1 C |
| 2005/0270151 | A1 | 12/2005 | Winick | |

| | | | | |
|---|---|---|---|---|
| 2006/0108432 | A1 * | 5/2006 | Mattheis | F24F 11/89 |
| | | | | 236/1 C |
| 2006/0234621 | A1 * | 10/2006 | Desrochers | F24F 3/044 |
| | | | | 454/239 |
| 2007/0008064 | A1 | 1/2007 | Donohue | |
| 2007/0229825 | A1 * | 10/2007 | Bates | G01N 15/1459 |
| | | | | 356/339 |
| 2008/0182506 | A1 * | 7/2008 | Jackson | F24F 11/30 |
| | | | | 454/354 |
| 2010/0101854 | A1 * | 4/2010 | Wallaert | F24F 11/00 |
| | | | | 174/502 |
| 2010/0170086 | A1 * | 7/2010 | Ramadan | H01L 24/95 |
| | | | | 29/834 |
| 2010/0253509 | A1 | 10/2010 | Fu et al. | |
| 2012/0085831 | A1 | 4/2012 | Kopp | |
| 2012/0136584 | A1 * | 5/2012 | Ban | G01N 15/1429 |
| | | | | 702/19 |
| 2012/0310418 | A1 * | 12/2012 | Harrod | G05B 19/042 |
| | | | | 700/276 |
| 2015/0096351 | A1 * | 4/2015 | Orsini | G01N 21/53 |
| | | | | 73/28.01 |

FOREIGN PATENT DOCUMENTS

| | | | |
|---|---|---|---|
| CN | 100478670 C | | 4/2009 |
| CN | 202720173 U | | 2/2013 |
| JP | 4-344057 A | | 11/1992 |
| JP | H11-258145 A | | 9/1999 |
| JP | 2000081240 A | * | 3/2000 |
| JP | 2000-154420 A | | 6/2000 |
| JP | 2001281129 A | * | 10/2001 |
| JP | 2001-306155 A | | 11/2001 |
| JP | 2005-504947 A | | 2/2005 |
| JP | 2007-107819 A | | 4/2007 |
| JP | 2008-005812 A | | 1/2008 |
| JP | 2009-229009 A | | 10/2009 |
| JP | 2009274603 A | * | 11/2009 |
| JP | 2012-72946 A | | 4/2012 |
| JP | 2019-070511 A | | 5/2019 |
| WO | 2002/63294 A2 | | 8/2002 |
| WO | 2004/010113 A1 | | 1/2004 |
| WO | 2010/113650 A1 | | 10/2010 |
| WO | 2014/043413 | | 3/2014 |

OTHER PUBLICATIONS

Tanaka, Air Treatment Apparatus, Mar. 21, 2000, JP2000081240A, Whole Document (Year: 2000).*

Che et al., air Conditioner, Apr. 2, 2008, CN201043783Y, Whole Document (Year: 2008).*

Suematsu et al., Intake Door Control Device for Vehicle, Nov. 26, 2009, JP2009274603A, Whole Document (Year: 2009).*

* cited by examiner

Particle sensor
exhaust
204

200

Injection molded
plastic enclosure 201

Graphic display +
Touch screen 202

Particle
sensor inlet
203

THERMOSTAT WITH INTEGRATED PARTICLE SENSOR

CROSS REFERENCE

This application is a National Phase entry of PCT application PCT/US2013/059549 filed on Sep. 12, 2013 (titled THERMOSTAT WITH INTEGRATED PARTICLE SENSOR by PARISEAU et al), which claims priority under 35 USC 119 from U.S. Provisional Application Ser. No. 61/700,208 filed on Sep. 12, 2012, titled THERMOSTAT WITH INTEGRATED PARTICLE SENSOR by PARISEAU, David et al, the entire disclosures of which are incorporated herein by reference.

BACKGROUND OF THE INVENTION

Thermostats have been in-use in residential and commercial buildings for a long time. They usually perform the control function solely based on temperature. With increased awareness of public health concerns related to environmental issues including, airborne particulates, volatile organic compounds VOC and oxygen content often inferred by the airs CO2 content, there is an opportunity to make living spaces more healthful through monitoring and control of the airborne particles. Also, as prices for the above monitoring devices have dropped due to large-scale integration and other factors, this has made economical the advent of a more intelligent thermostat. Therefore, what is needed is a system and method for monitoring airborne particles in addition to temperature.

SUMMARY

In accordance with various aspects and teaching of the present invention, a thermostat system is disclosed that includes an integrated airborne particle sensor and a temperature controller, among other features in accordance with the teachings of the present invention.

DESCRIPTION OF THE INVENTION

Figure 1:
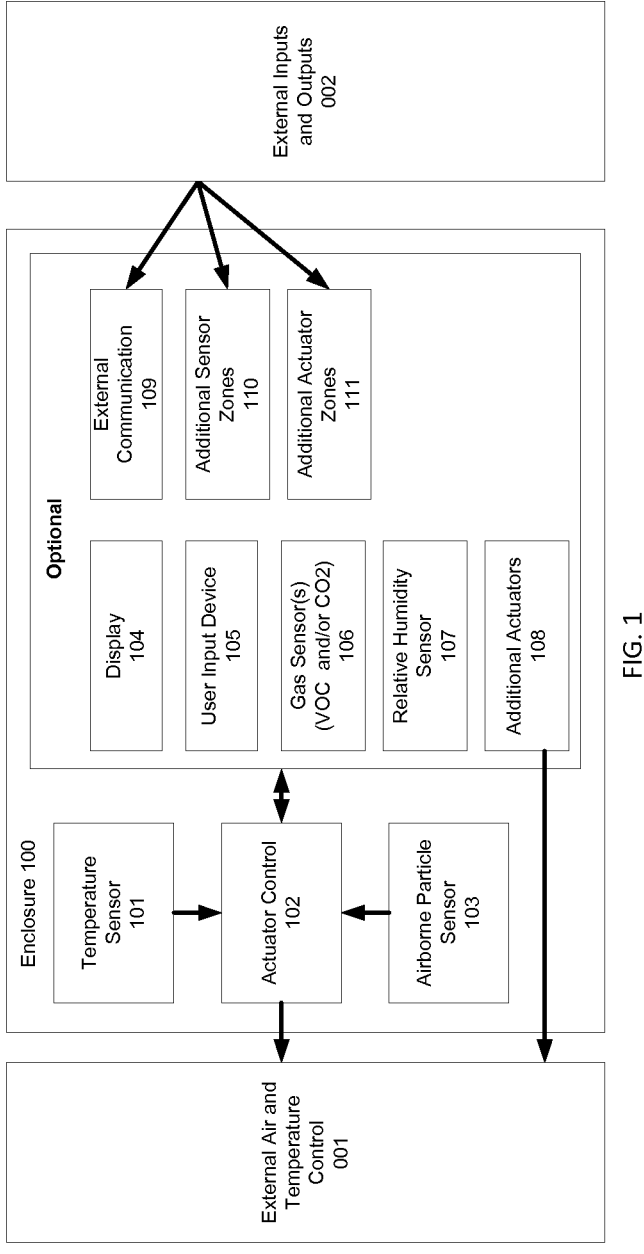
FIG. 1 is a block diagram of a thermostat in accordance with the teachings of the present invention.

Referring now to FIG. 1, a thermostat system includes an enclosure 100 with at least one temperature sensor 101, at least one actuator control 102 and an airborne particle sensor 103. The temperature sensor 101 includes a wide variety of possible sensors, PTC, NTC, thermocouples, silicon based sensors, etc. Types of actuators include relays, transistors, FETs, etc. The airborne particle sensor 103 uses, at least in part, a light source through a cavity, where the air is routed and uses either light blocking or light scattering measurement of particles. In accordance with various aspects of the present invention, the airborne particle sensor 103 can count total particles. In accordance with another aspect, the airborne particle sensor 103 counts particles by size bins. In accordance with yet another aspect of the present invention, the airborne particle sensor 103 determines mass concentration of particles, or even convert particulate information into some other form.

In accordance with various aspects of the present invention, the actuator control 102 may be an on-board micro-controller or processor that processes various inputs at least temperature and particulate information and controls at least one acutator. In accordance with various aspects of the present invention, the actuator control 102 may be a relay, transistor, or FET, or it could be a solenoid, valve, optical isolator, galvanic isolator, etc. In accordance with various aspects of the present invention, the actuator control 102 communicates with an external air/temperature handler 001. In most cases this would be a central heating and/or cooling unit for a residence of commercial property. However, in accordance with another aspect of the present invention, the handler 001 may be a stand-alone unit located near the thermostat system or remotely.

In accordance with various aspects of the present invention, a number of optional elements can also be added to the thermostat system to enhance its functionality including a display or indicator element 104. This can include LEDs, LCDs, or various graphic display technologies, either alone or in combination. Some type of input device 105 could also be added, as in buttons, graphic display touch screen, touch sensitive buttons, dials, knobs, etc. Various types of gas sensors 106 are possible, either one or more sensors to detect the presence, and concentration, of VOCs and a separate sensor for measuring or inferring CO2 or lack of oxygen content, or a single sensor integrating both functions. The thermostat system, in accordance with the various aspects of the present invention, may include a relative humidity sensor 107. In accordance with various aspects of the present invention, additional actuators 108 permit applications that seek to provide specific control for various conditions, including:

A) actuating both heating and fans when temperatures fall below a specified setpoint, B) actuating both cooling and fans when temperatures rise above a specified setpoint, C) actuating fans and filtration when airborne particle counts rise above a specified setpoint, D) actuating fans and filtration when VOC counts rise above a specified setpoint, E) actuating an air-exchanger when CO2 rises above a specified setpoint, F) actuating a de-humidifier when relative humidity rises above a specified setpoint, and G) actuating a humidifier when relative humidity falls below a specified setpoint.

In accordance with various aspects of the present invention, other actuation/control combinations are possible and in general can simply be defined by the user interface. Combinations of sensor values could be considered together and weighted results used to give perhaps better control results.

In accordance with various aspect of the present invention, the thermostat system includes external communication unit 109. The unit 109 includes external interfaces to external inputs and outputs 002, which are wired or wireless connections so that the thermostat system can be interfaced with remotely, such as through a web interface to allow data to be queried from the thermostat system as well as adjustment of controls. The web interface will also allow data to be logged for later analysis, perhaps to refine power-usage, or performance, or to chart environmental conditions over time in a living area. Other possible interfaces include removable memory modules, which might provide the same logging functions, or provide desired setpoints or control algorithms. In accordance with the various aspects of the present invention, the external communication unit 109 is located externally or remotely.

In accordance with various aspects of the present invention, the thermostat system also is extended to handle sensors 110 and/or actuators 111 from multiple zones. These could be connected via wires or connected wirelessly, through external communication unit 109, which in accordance with one aspect of the present invention, is a wireless unit. For example, in accordance with one aspect of the present invention, two or more thermostat systems or units communicate with each other through the wired or wireless connections. The various thermostat systems would communicate with a main or central thermostat system. Thus, sensors form multiple areas or zones can be used to make a more comprehensive decision about management of the environment.

As noted above, the external communication unit 109 is placed remotely and multiplexes signals from the sensors 110 and the actuators 111 over the actuator control 102. Thus, existing wiring could be used to provide power to the unit and, in accordance with one aspect of the present invention, also provide a communication link that acts as a central point or a hub between thermostats. In accordance with another aspect of the present invention, the communication link provides a connection between sensors or actuators. In accordance with yet another aspect of the present invention, the external communications link might also act as a global decision maker for the system, aggregating data from multiple intelligent thermostats and sensors and managing the actuators according to some global strategy based on rules, schedules, or remote access (as in a web interface or the equivalent). Thus, using a wire or wireless communication, each thermostat system can provide data to a central location based on the type of sensor deployed in the thermostat unit and the scope of the present invention is not limited thereby. For example, sensors can be used to detect motion and based on the presence of motion determine if a heating, cooling, or filtering function should be activate for the environment monitored by that particular thermostat based on global rules or policies related to controlling the environment. Furthermore, the rules and setting can be controlled or set at the thermostat unit or remotely through the external inputs and outputs 2, such as use of an application through a personal or wireless device that connects to the thermostat using the external inputs and outputs 2

Figure 2:
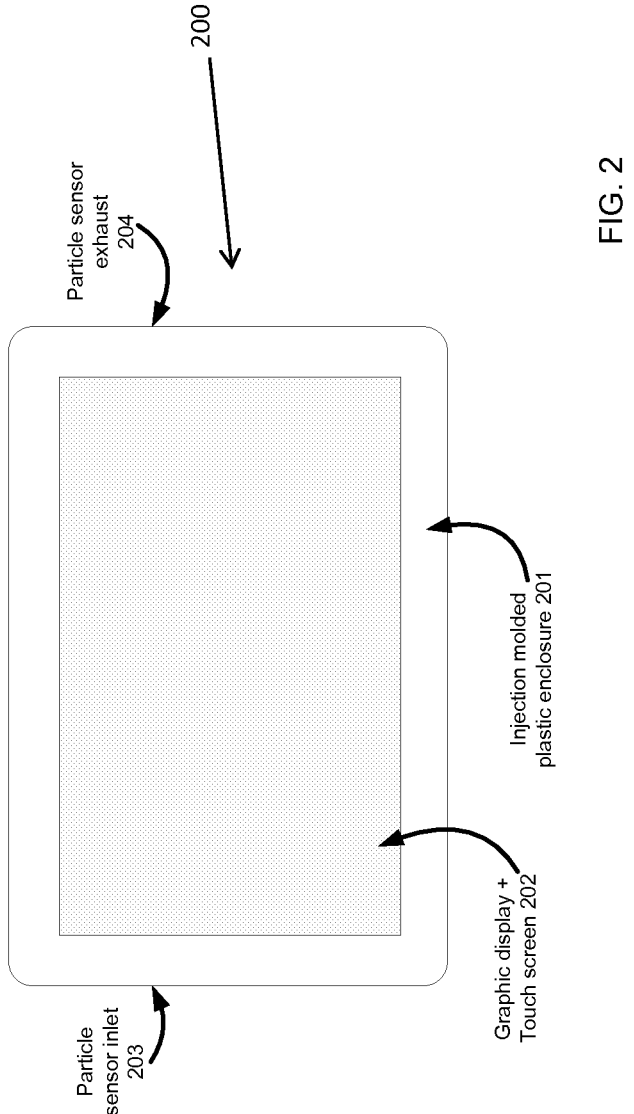
FIG. 2 is the thermostat of FIG. 1 in accordance with the teachings of the present invention.

In accordance with one aspect of one embodiment of the present invention, a thermostat system or unit 200 is shown in FIG. 2 and includes an enclosure 201, a graphic user interface or display or touch screen 202, and particle sensor inlet 203, and exhaust 204. The unit 200 would be mounted on the wall with the power/actuation wires entering from the rear of the unit 200 (not shown).

Figure 3:
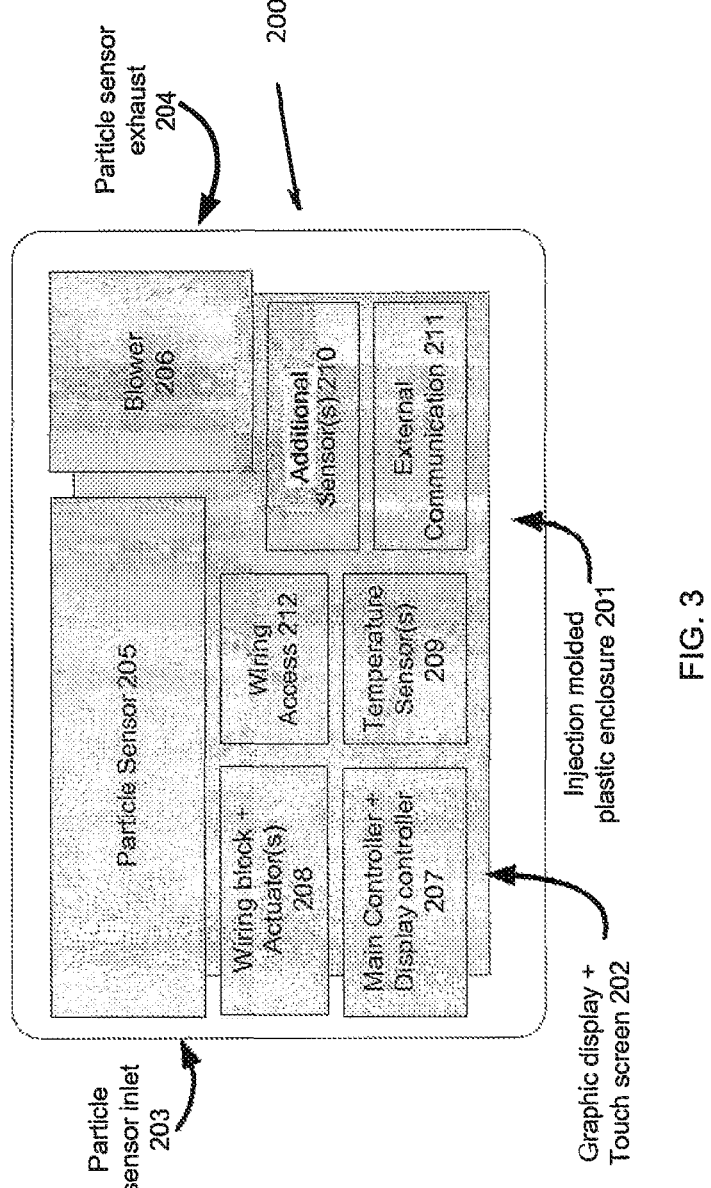
FIG. 3 is the thermostat of FIG. 2 with the enclosure and a display shown as transparent to reveal the various functional blocks, in accordance with the teachings of the present invention.

The unit 200 of FIG. 2 is shown in FIG. 3 with the enclosure 201 and display 202 shown as transparent to reveal the various functional blocks within. The enclosure 201, the screen 202, the particle sensor inlet 203, and the exhaust 204 are shown. In addition, wiring access 212 shown in the center of the unit usually as a hole within the back of the unit 200. The back of the unit 200 would typically also have mounting holes to facilitate fastening the unit 200 to the wall. These wires, which would include power for the unit, as well as the various actuator signal wires are connected to a wiring block or connector 208; from there the various actuator signals would be connected to the actuators via the circuit board. The circuit board would also contain the microcontroller and display controller 207 for the thermostat. In accordance with one aspect of the present invention, these functions could be integrated into a single chip. In accordance with another aspect of the present invention, the functions are integrated into various combinations of chips or microprocessors.

The unit 200 also includes a temperature sensor 209. The temperature sensor 209 provides local temperature for the unit 200, and the particle sensor 205 provides particulate counts perhaps in various size bins. The unit 200 includes a blower or fan 206. The fan 206 provides airflow for the particle sensor 205. In accordance with the various aspects of the present invention, a sophisticated version might include a pressure or flow sensor 205$a$ for the particle sensor 205 to ensure that the expected airflow was present. Additional sensors 210 might include VOC sensor(s), CO2 sensors, relative humidity sensors, and/or others. An external communication interface 211, in accordance with at least one aspect of the present invention, is implemented as a wireless interface like Wi-Fi or Zigbee.

Figure 4:
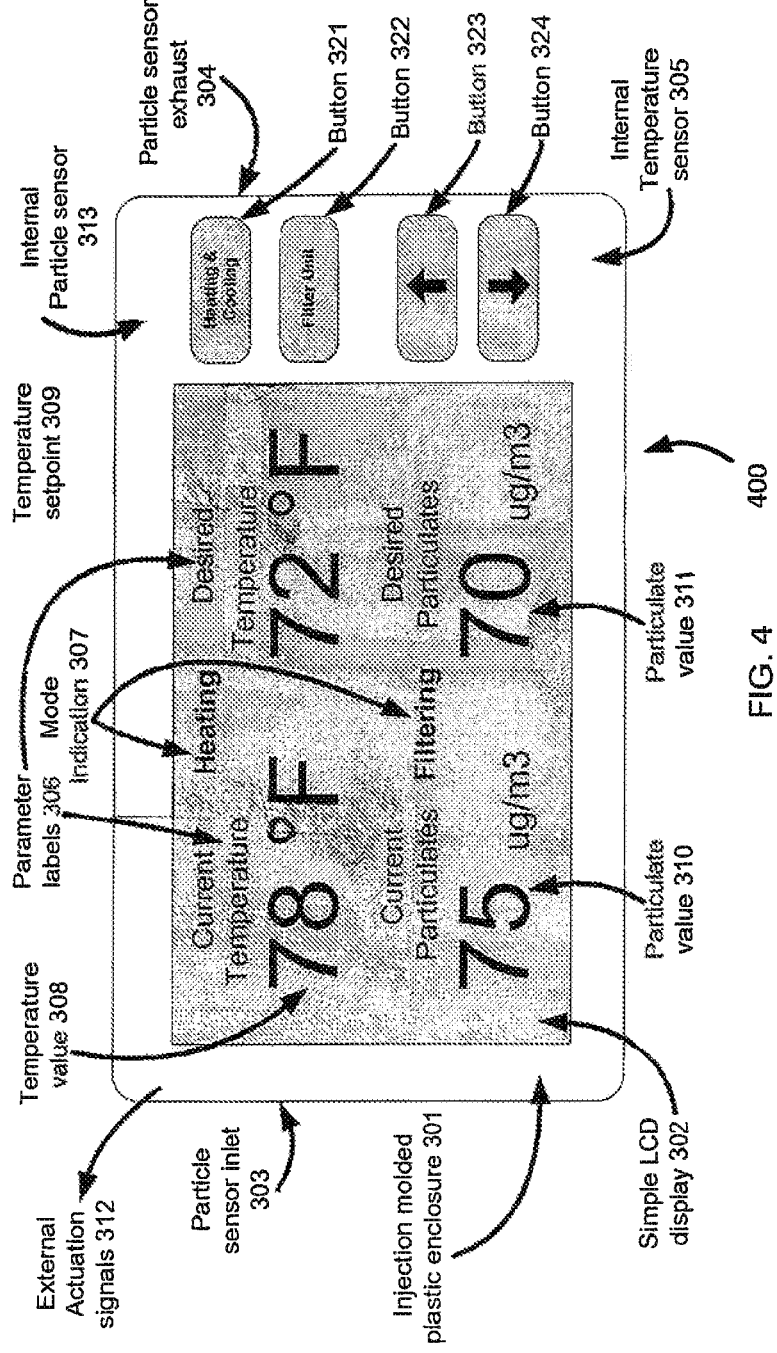
FIG. 4 is the thermostat of FIG. 2 with the display content and control buttons, in accordance with the teachings of the present invention.
Figure 5:
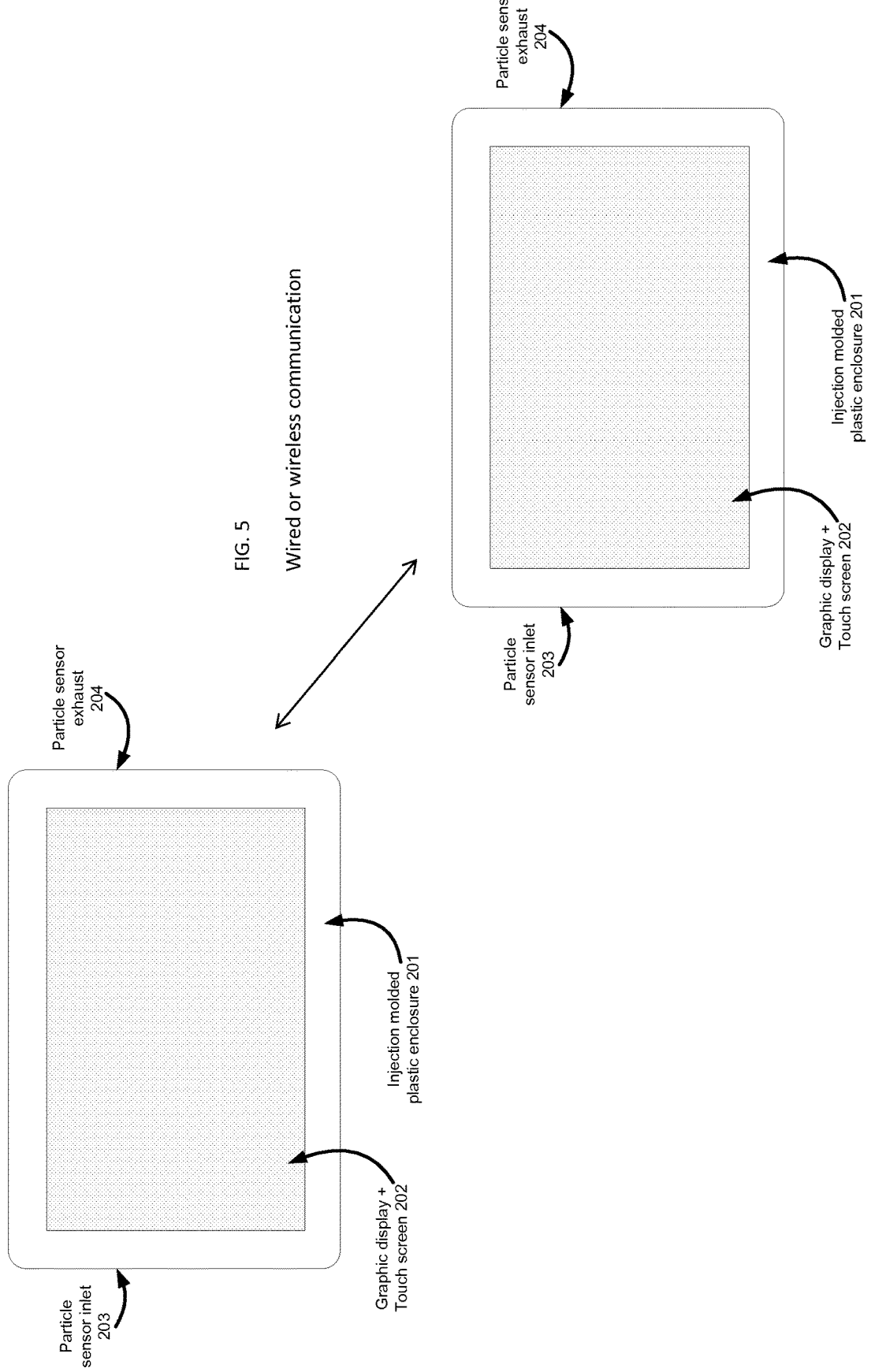
FIG. 5 shows two thermostat systems in communication, in accordance with the teachings of the present invention.

Referring now to FIG. 4, in accordance with various other aspects of the present invention, a thermostat system OR unit 400 is shown. The unit 400 is housed inside a low cost plastic typically injection molded enclosure 301. It will be apparent to those skilled in the art that the type of material used for the enclosure 301 does not limit the scope of the present invention. The enclosure 301 holds or surrounds a custom segmented LCD display 302, a particle sensor inlet 303, a particle sensor exhaust 304, and internal particle sensor 313. In accordance with one aspect of the present invention, the glass display 302 has some fixed parameter labels 306, such as silk-screen or overlaid on the glass of the display 302. The display 302 also shows active information, such as mode indicators 307 and temperature values 308. In accordance with one aspect of the present invention, the unit 400 includes buttons 321, 322, 323, 324. The buttons 321, 322, 323, 324 may be of a variety of materials and the scope of the present invention is not limited thereby. For examples, the buttons, in accordance with one aspect of the present invention, are plastic caps or carbon impregnated rubber keys that would allow the user to manipulate the basic functions of the unit 400 and the scope of the present invention is not limited by the type of function associated with each button.

The user can change heating/cooling modes via the Heating & Cooling button 321, which would toggles through the various heating modes, as shown by the mode indicator 307 on the display 302. These might include Off, Heating, Cooling, and Auto. The unit 400 includes a temperature sensor 305. The temperature value 308 would be calculated based on the value read from an internal temperature sensor 305 and continually displayed regardless of the mode.

The display 302 shows a setpoint or desired temperature value 309. In the "OFF" mode, the desired temperature value 309 would not be displayed and all temperature actuation signals would be disabled. If the "HEATING" mode was selected, then the temperature setpoint 309 could be adjusted using the up button 323 or the down button 324. Internally, the unit 400 would then compare the actual temperature value 308 based on the internal temperature sensor 305. If the actual temperature value 308 was below the desired temperature value 309 and the unit 400 is in the Heating mode, then the unit 400 would drive or send a heating actuation signal 312 to some external heating unit. The process would be repeated anytime the temperature value 308 fell below the desired temperature value 309. It might also drive an external Fan actuating signal to distribute the heat, in the case of forced air units. The heating/fan signals may not be exactly coincident in that the activation of the fan may lag the activation of the heating unit, so the air gets warmed but the fan starts and then continues to blow heated air for some time after the heating actuator has been turned off. Typically the thermostat also implements some hysteresis around the desired setpoint to reduce the number of start/stop cycles.

Cooling would function in a similar manner, with the temperature comparisons in the reverse. A cooling mode, as shown by the mode indicator 307, would get selected using the Heating & Cooling button 321, and the desired temperature setpoint might get set after this selection. Once setup, the unit 400 would engage an external air-conditioner using the appropriate external actuation signal 312. If the current temperature value 308 rises above the desired temperature value 309, then the external actuation signal 312 is sent to the external air-conditioner. The fan actuation signal would typically function the same way as with heating process for actuation of the external heating unit.

An auto mode might add some intelligence to allow the unit to control both heating and cooling units. This is not typically done to avoid wasting energy cycling between both of these modes, due to myriad factors, but intelligent algorithms are possible make this feasible.

The unit 400 also includes analysis of particulates or particles in the environment. The user would select the filter mode 307 using the Filter Unit button 322, which might cycle between Off, On, Auto modes in accordance with some aspects of the present invention. The selected mode would be displayed via the mode indicator 307. The unit 400 displays a current particulate value 310. The particulate value 310 is calculated based on the value read from an internal particle sensor 313 and continually displayed regardless of the mode indicator 307 as selected by the user. In this case the unit 400 is displaying particle concentration, but the same idea applies with particulate counts, or other units. In the OFF mode, control of a filter unit (not shown) would be disabled and a desired particulate value 311 would be omitted from the display 302. In the ON mode, the filter unit actuation signal 312 would be used to control the filter unit as the signal 312 is asserted or sent and left thus, while the unit 400 was in the ON mode, so that the filter unit continues to filter, regardless. The desired particulate value 311 would be omitted from the display in accordance with one aspect of the present invention.

In AUTO mode, the user would adjust the desired particulate value 311 using the up button 323 and the down button 324. In this mode, if the current particulate value 310 rises above the desired particulate value 311, then the filter unit actuation signal 312 would be asserted or sent as long as the current particulate level 310 remained above the desired particulate value 311. Typically hysteresis would also be added to this threshold to minimize cycling the filter unit on/off. When the current particulate value 310 drops below the desired particulate value 311, then a signal is sent to the filter unit to turn off the filter unit.

As will be apparent to those of skill in the art upon reading this disclosure, each of the aspects described and illustrated herein has discrete components and features which may be readily separated from or combined with the features and aspects to form embodiments, without departing from the scope or spirit of the present invention. Any recited method can be carried out in the order of events recited or in any other order which is logically possible.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein.

In accordance with the teaching of the present invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that includes a series of instructions, such as computer readable program steps or code encoded therein. In certain aspects of the present invention, the non-transitory computer readable medium includes one or more data repositories. Thus, in certain embodiments that are in accordance with any aspect of the present invention, computer readable program code (or code) is encoded in a non-transitory computer readable medium of the computing device. The processor, in turn, executes the computer readable program code to create or amend an existing computer-aided design using a tool. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the present invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins;

discrete logic which implements a fixed version of the article of manufacture or system; and programmable logic which implements a version of the article of manufacture or system which can be reprogrammed either through a local or remote interface. Such logic could implement either a control system either in logic or via a set of commands executed by a soft-processor.

Accordingly, the preceding merely illustrates the various aspects and principles of the present invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the various aspects discussed and described herein. Rather, the scope and spirit of present invention is embodied by the appended claims.

The invention claimed is:

1. A thermostat for monitoring air quality and controlling environment in a living space of a residential or commercial building comprising:

a temperature sensor in a wall mounted thermostat enclosure having an external communication interface wherein a measured temperature value and a measured particle count value are communicated to an external device for logging of the measured temperature and particle count values wherein the wall mounted thermostat enclosure has a wiring access to provide power to the thermostat;

at least one control processor in the wall mounted thermostat enclosure, the at least one control processor being configured with a software program to control the external communication interface and operate with a temperature setpoint and a particulate setpoint, the at least one control processor being connected to the temperature sensor and a light sensing airborne particle measurement sensor;

a fan or a blower in the thermostat enclosure that actuates an airflow in the wall mounted thermostat enclosure wherein the airflow passes through a particle sensor inlet and a particle sensor exhaust of the thermostat enclosure;

an actuator control communicating with the at least one control processor, the actuator control generating control signals that control a building air handler device that is external to the wall mounted thermostat enclosure that adjusts at least one of air filtering, heating and cooling in the living space of a residential or commercial building in response to sensor data; and wherein the light sensing airborne particle measurement sensor in the wall mounted thermostat enclosure is configured to measure a plurality of particles in the airflow wherein the light sensing airborne particle measurement sensor counts a number of particles and communicates measured particle count values to the control processor, each of the particle count values including at least a number of particles counted by size bins, and wherein the actuator control communicates with the building air handler device to control at least one of air filtering, heating and cooling in the living space with the residential or commercial building air handler device and wherein the actuator control actuates an air filtration system when an airborne particle count value rises above the particulate setpoint.

2. The thermostat of claim 1, wherein the wall mounted thermostat enclosure further comprises a gas sensor to measure total Volatile Organic Compounds (VOC).

3. The thermostat of claim 1, further comprising an additional sensor in communication with the at least one control processor, wherein the sensor data from different sensors is weighted and processed to control the building air handler device.

4. The thermostat of claim 1, further comprising a humidity sensor in communication with the at least one control processor, wherein the humidity sensor measures relative humidity.

5. The thermostat of claim 1, further comprising a user interface input unit coupled to the at least one control processor such that a user can provide input to the thermostat to adjust a thermostat operation.

6. The thermostat of claim 1, wherein each of the sensors are used to control one actuator selected from a plurality of actuators according to one or more pre-defined control algorithms and selectable setpoints to operate an air filter.

7. The thermostat of claim 1 wherein sensor data is communicated to at least one of a display that includes a user interface and the external device by a wireless interface.

8. The thermostat of claim 1 further comprising a display that displays the temperature setpoint and the particulate setpoint.

9. The thermostat of claim 1 wherein the external communication interface comprises a wireless connection to the external device.

10. The thermostat of claim 1 wherein the external communication interface comprises a web interface.

* * * * *